W. A. NEAL.
RESILIENT TIRE FOR AUTOMOBILE WHEELS.
APPLICATION FILED OCT. 12, 1917.

1,269,842.

Patented June 18, 1918.
2 SHEETS—SHEET 2.

UNITED STATES PATENT OFFICE.

WILLIAM A. NEAL, OF LEWISBURG, WEST VIRGINIA.

RESILIENT TIRE FOR AUTOMOBILE-WHEELS.

1,269,842.  Specification of Letters Patent.  Patented June 18, 1918.

Application filed October 12, 1917. Serial No. 196,156.

*To all whom it may concern:*

Be it known that I, WILLIAM A. NEAL, a citizen of the United States, residing at Lewisburg, in the county of Greenbrier, State of West Virginia, have invented a new and useful Resilient Tire for Automobile-Wheels; and I do hereby declare the following to be a full, clear, and exact description of the invention, such as will enable others skilled in the art to which it appertains to make and use the same.

This invention relates to an improved resilient tire for automobile wheels, and one of the objects of the invention is to provide a simple and improved, efficient and practical device of this kind having an inner band to be arranged between the opposite parts of the outer casing, and a wooden tube consisting of sections semi-circular in cross section and being spaced from said band, in combination with yieldable means between the wooden tube and said band, and yieldable means between the sections of said wooden tube.

A further object of the invention is to provide a resilient tire of this kind, which consists of few parts, and is durable, and may be manufactured at a small cost and sold at a reasonable profit.

In practical fields the details of construction may necessitate alterations falling within the scope of what is claimed.

The invention comprises further features and combination of parts as hereinafter set forth shown in the drawings and claimed.

In the drawings:—

Fig. 3 is a sectional view taken in a direction similar to that of Fig. 2, but showing the wooden tube in elevation.

Figure 1:
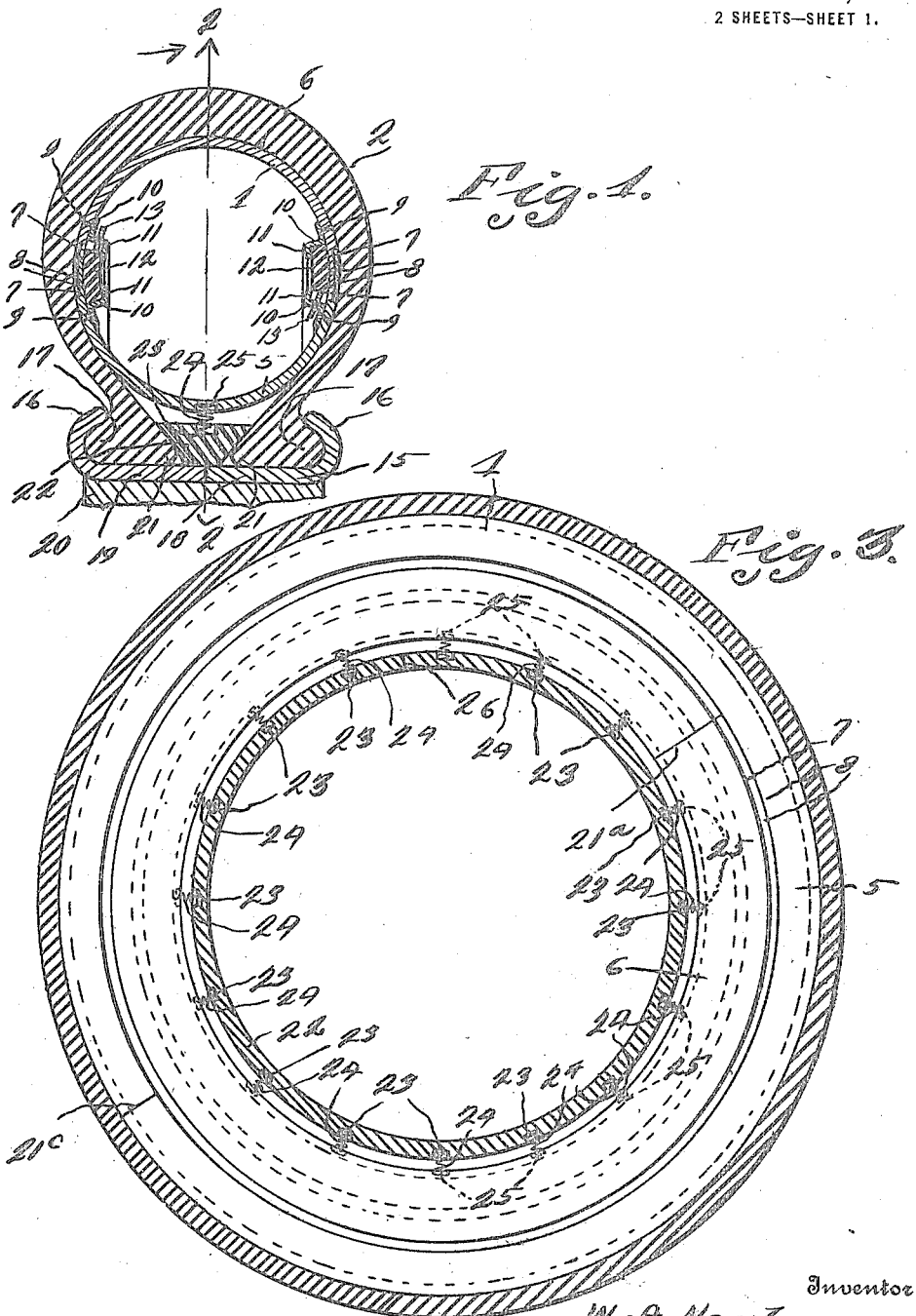
Figure 1 is a cross sectional view through the improved resilient tire showing same constructed in accordance with the invention.
Figure 2:
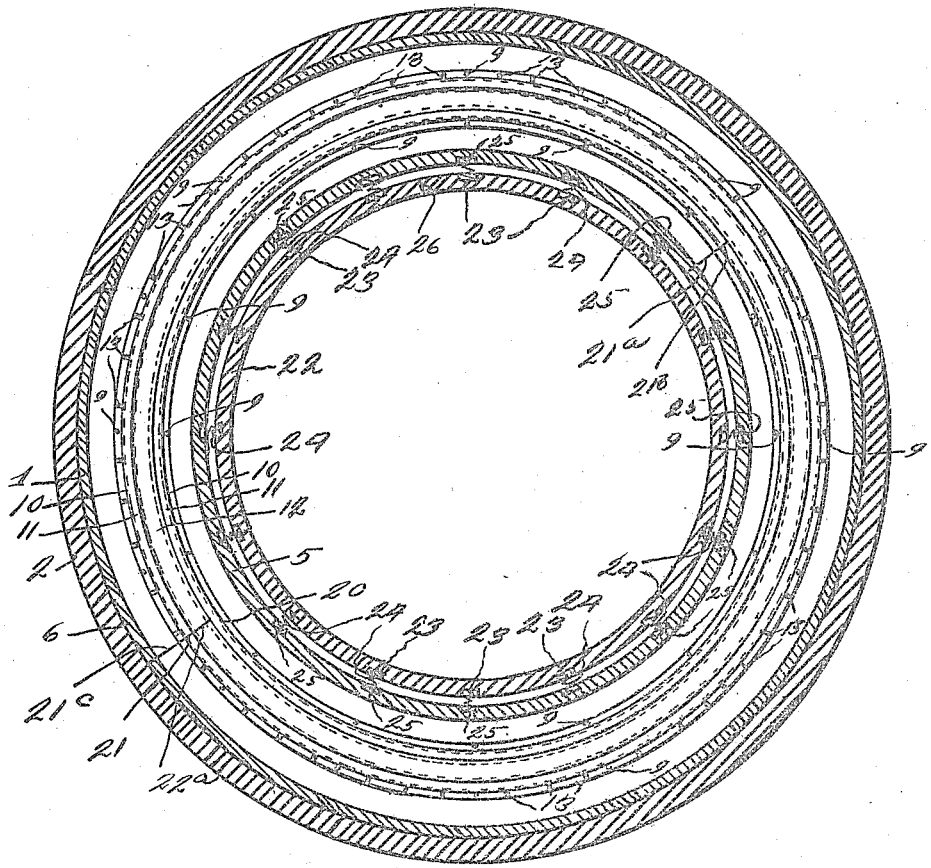
Fig. 2 is a sectional view on line 2—2 of Fig. 1.

Referring more especially to the drawings, 1 designates a wooden tire tube, which is disposed adjacent the inner surface of the outer tire casing 2. The tube comprises the inner and outer sections 5 and 6, which may be constructed of any suitable material, preferably wood such as hickory, dog-wood or the like. The side portions of the sections 5 and 6 are reversely overlapped. In fact the side portions of said sections have reversely arranged annularly extending recesses 7 (which are angular in cross section) whereby said reduced parts or flanges 8 may reversely overlap, said flanges or reduced parts engaging said recesses 7. Secured by rivets or the like 9 to the inner face at opposite sides of each wooden section are metallic rings 10 angular in cross section. The flanges 11 of said angular rings extend toward each other, and overlap the rubber annular rings 12, to hold said rings 12 adjacent the overlapped joints of the wooden sections, thereby preventing said overlapped joints from separating, in other words holding the overlapping parts of said joints in alinement. The inner ring on one side of said tire and the outer ring on the opposite side are provided with suitable set screws or members 13, which are adapted to be set up, for holding the rubber rings against the opposite rings 10, thereby further preventing-displacement of the attendant parts. The outer casing 2 of the tire is mounted upon the usual wheel rim 15, which is provided with the usual clencher flanges 16, which are engaged by the beads 17 of the opposite sides of the tire casing 2, to hold said casing on the rim 15. The rim 15 consists of the two sections 18 and 19, and said rim 15 is mounted upon the usual wheel felly 20. Disposed between the parts 21 of the tire casing 2, and engaging the rim 15 is a circular band 22, which is angular in cross section, and has diagonal opposite sides in order to conform to the contour of the parts 21 of the casing 2. This circular band is designed to be constructed of any suitable material, either wood, rubber or a composition of rubber, preferably some suitable yieldable material. The band 22 is provided with a plurality of pockets 23, in which the coil springs 24 are mounted. These springs in turn engage pockets 25 in the exterior of the inner section 5 of said wooden tube. By means of the springs 24, the wooden tube 1 may move with relation to the band 22, and by means of the rubber rings 12 the outer section 6 of the wooden tube may move with relation to said inner section 5. In order to assemble the parts of this tire, the rings 10 are connected to the sections 5 and 6 of the wooden tube, and said sections 5 and 6 and the rings 10 are severed as shown at 21$^a$, 21$^b$, and 21$^c$, while the rubber rings are severed as shown at 22$^a$. The section 6 of the wooden tube is then sprung into the outer casing of the tire 2, the rubber rings are then arranged in place in the rings 10 of the section 6. The inner section 5 of the wooden tube is then sprung into the outer casing 2, until it overlaps the outer section 6 and the rings of said inner section engage the rubber rings. The band 22, which is also severed as shown at 26 is then sprung into place between the parts 21 of the outer casing 2 of the tire, the springs 24 first having been arranged in engagement with the pockets 25. These parts as thus assembled are arranged as shown on the rim 15, whereby the clencher flanges 16 may engage the flanges 17 of the casing 2. The construction of a tire of this kind is designed to take the place of the usual pneumatic tire.

The invention having been set forth what is claimed as new and useful is:—

1. In a resilient tire, an outer casing, a wooden tube arranged adjacent the inner surface of said casing, said wooden tube comprising inner and outer sections semi-circular in cross section and having its opposite sides provided with sliding overlapped joints, a circular band between the adjacent faces of the inner parts of the outer casing, and resilient means between said band and the wooden tube.

2. In a resilient tire, an outer casing, a wooden tube arranged adjacent the inner surface of said casing, said wooden tube comprising inner and outer sections semi-circular in cross section and having its opposite sides provided with sliding overlapped joints, a circular band between the adjacent faces of the inner parts of the outer casing, and springs between the band and said wooden tube.

3. In a resilient tire, an outer casing, a wooden tube arranged therein adjacent its inner face, said wooden tube consisting of a pair of sections semi-circular in cross section, said sections of the wooden tube having slidable overlapped joints, two pairs of annular rings angular in cross section, each pair consisting of inner and outer rings, one carried by the inner face of each side of each section of the wooden tube, resilient rubber rings adjacent said overlapped joints and being held in place by the pairs of angular rings, and means carried by one of said angular rings of each pair to engage its adjacent rubber ring.

4. In a resilient tire, an outer casing, a wooden tube, arranged therein adjacent its inner face, said wooden tube consisting of a pair of sections semi-circular in cross section, said sections of the wooden tube having slidable overlapped joints, two pairs of annular rings angular in cross section, each pair consisting of inner and outer rings, one carried by the inner face of each side of each section of the wooden tube, resilient rubber rings adjacent said overlapped joint and being held in place by the pairs of angular rings, means carried by one of said angular rings of each pair to engage its adjacent rubber ring, and a circular band between the adjacent faces of the inner parts of the outer casing, and springs between the band and said wooden tube.

In testimony whereof I have signed my name to this specification in the presence of two subscribing witnesses.

WILLIAM A. NEAL.

Witnesses:
W. R. BURDETTE,
H. C. SKAGGS.

Copies of this patent may be obtained for five cents each, by addressing the "Commissioner of Patents, Washington, D. C."